(12) United States Patent
Kumagai et al.

(10) Patent No.: US 7,626,690 B2
(45) Date of Patent: Dec. 1, 2009

(54) LASER SCANNER

(75) Inventors: Kaoru Kumagai, Itabashi-ku (JP);
Ken-ichiro Yoshino, Itabashi-ku (JP);
Yasushi Tanaka, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 307 days.

(21) Appl. No.: 11/899,289

(22) Filed: Sep. 5, 2007

(65) Prior Publication Data
US 2008/0074637 A1 Mar. 27, 2008

(30) Foreign Application Priority Data
Sep. 26, 2006 (JP) ............... 2006-261203

(51) Int. Cl.
*G01C 1/00* (2006.01)
*G01C 3/08* (2006.01)
*G02B 23/00* (2006.01)

(52) U.S. Cl. .............. 356/141.1; 356/4.01; 359/399
(58) Field of Classification Search ........... 356/4.01, 356/5.01, 141.1, 141.5; 359/399
See application file for complete search history.

(56) References Cited

U.S. PATENT DOCUMENTS

| | | | | |
|---|---|---|---|---|
| 5,898,490 A | * | 4/1999 | Ohtomo et al. | 356/141.3 |
| 6,292,263 B1 | * | 9/2001 | Norita et al. | 356/639 |
| 6,330,523 B1 | | 12/2001 | Kacyra et al. | 702/159 |
| 6,825,796 B2 | * | 11/2004 | Oki | 342/70 |
| 7,092,075 B2 | * | 8/2006 | Singh et al. | 356/4.01 |
| 2004/0125357 A1 | | 7/2004 | Ohtomo et al. | 356/5.13 |

FOREIGN PATENT DOCUMENTS

| | | |
|---|---|---|
| EP | 1 061 335 | 12/2000 |
| JP | 2000-509150 | 7/2000 |
| WO | 97/40342 | 10/1997 |

OTHER PUBLICATIONS

European communication dated Jul. 3, 2009.

\* cited by examiner

*Primary Examiner*—Isam Alsomiri
(74) *Attorney, Agent, or Firm*—Nields, Lemack & Frame, LLC

(57) ABSTRACT

A laser scanner, comprising a mirror rotatably provided, a driving unit for rotating the mirror, a distance measuring unit for projecting a distance measuring light for scanning to a measurement range via the mirror and for obtaining a position data by receiving the reflected distance measuring light via the mirror, a measuring direction observing means for indicating a projecting direction of the distance measuring light, and an operation unit for setting the measurement range by designating at least two measuring directions based on the result of observation of the measuring direction obtained by the measuring direction observing means.

8 Claims, 7 Drawing Sheets

LASER SCANNER

BACKGROUND OF THE INVENTION

The present invention relates to a laser scanner for acquiring three-dimensional data of an object to be measured by projecting a distance measuring light to the object to be measured, by measuring a distance to the object to be measured after receiving a light reflected from the object, and by detecting a projecting direction of the distance measuring light when measurement is made.

A type of laser scanner is known, by which it is possible to perform measurement at a multiple of points on an object to be measured. The laser scanner projects a pulsed laser beam as a distance measuring light and scans over a measurement area as required including an object to be measured and measures a distance by receiving a light reflected from the object to be measured for each pulsed laser beam, and acquires three-dimensional data by detecting a direction (i.e. horizontal angle and elevation angle) of the pulsed laser beam at the time of distance measurement.

When measurement is performed by using the laser scanner, it is necessary to set up a range to be measured, i.e. a range, to which a pulsed laser beam is projected for scanning. In the past, it has been practiced to connect an external control system such as a personal computer (PC) to the laser scanner. It has been practiced to set up a measurement range by inputting numerical values of horizontal angles and vertical angles on points to designate and define the measurement range, e.g. four points in the case where the measurement range is in form of a rectangle.

In the case the measurement range is set up by inputting numerical values, an operator of the measurement cannot numerically recognize as to in which direction the object to be measured is positioned with respect to the laser scanner. For this reason, the inputting of numerical values and the measurement had to be repeatedly performed, and the final measurement range had to be set up through repeated trials and errors.

Alternatively, in the case the laser scanner is provided with an image pickup device, an image of visual field acquired by the image pickup device can be displayed on a display unit of the PC, and the measurement range can be set up on the image on the PC. When the image is incorporated into the PC from the laser scanner, numerical values on a range to be incorporated must be set up again from the PC, and complicated procedures cannot be avoided. In this respect, it is necessary to acquire an image, which is far wider and extensive than the measurement range itself, and this means that much time is needed for acquiring the image.

SUMMARY OF THE INVENTION

It is an object of the present invention to provide a laser scanner by which it is possible to set up a measurement range in simple manner by using a single laser scanner without using an external control system such as a PC and to perform the measuring operation with higher working efficiency.

To attain the above object, the present invention provides a laser scanner, which comprises a mirror rotatably provided, a driving unit for rotating the mirror, a distance measuring unit for projecting a distance measuring light for scanning to a measurement range via the mirror and for obtaining a position data by receiving the reflected distance measuring light via the mirror, a measuring direction observing means for indicating a projecting direction of the distance measuring light, and an operation unit for setting the measurement range by designating at least two measuring directions based on the result of observation of the measuring direction obtained by the measuring direction observing means. Also, the present invention provides the laser scanner as described above, wherein the measuring direction observing means is a sighting device mounted on the mirror. Further, the present invention provides the laser scanner as described above, wherein the sighting device comprises an optical path deflecting means for deflecting a collimating direction. Also, the present invention provides the laser scanner as described above, wherein the measuring direction observing means is provided separately from the mirror, and comprises a telescope unit and an optical path deflecting means for deflecting an optical axis of the telescope unit in the projecting direction of the distance measuring light. Further, the present invention provides the laser scanner as described above, wherein the measuring direction observing means comprises a digital image pickup unit for acquiring image data via the mirror and a display unit for displaying the acquired image. Also, the present invention provides the laser scanner as described above, wherein the measuring direction is designated on a display screen displayed on the display unit. Further, the present invention provides the laser scanner as described above, wherein the mirror can be rotated in a horizontal direction and in an elevation direction, and wherein the laser scanner further comprises a horizontal angle detector for detecting a horizontal angle of the mirror and an elevation angle detector for detecting an elevation angle of the mirror, and wherein the measuring direction is designated based on the horizontal angle detected by the horizontal angle detector and based on the elevation angle detected by the elevation angle detector. Also, the present invention provides the laser scanner as described above, wherein the mirror can be rotated in a horizontal direction and in an elevation direction, and wherein the laser scanner further comprises a horizontal angle detector for detecting a horizontal angle and an elevation angle detector for detecting an elevation angle, and wherein the measuring direction is designated based on the horizontal angle detected by the horizontal angle detector and based on the elevation angle detected by the elevation angle detector, and also based on a position on the screen.

According to the present invention, a laser scanner comprises a mirror rotatably provided, a driving unit for rotating the mirror, a distance measuring unit for projecting a distance measuring light for scanning to a measurement range via the mirror and for obtaining a position data by receiving the reflected distance measuring light via the mirror, a measuring direction observing means for indicating a projecting direction of the distance measuring light, and an operation unit for setting the measurement range by designating at least two measuring directions based on the result of observation of the measuring direction obtained by the measuring direction observing means. As a result, the measurement range can be set up without using an external control device such as a PC. Also, the measurement range can be set up by continuously confirming the measuring direction, and this contributes to the achievement of higher working efficiency.

Also, according to the present invention, the measuring direction observing means is a sighting device mounted on the mirror. As a result, the system with simple structure can be attained, and the measuring direction can be easily associated with the result of observation on the measuring direction.

Further, according to the present invention, the sighting device comprises an optical path deflecting means for deflecting a collimating direction. This makes it possible to perform the collimation by the measurement operator regardless of the measuring direction.

Also, according to the present invention, the measuring direction observing means comprises a digital image pickup unit for acquiring image data via the mirror and a display unit for displaying the acquired image. This makes it possible to set the measurement range by the measurement operator regardless of the measuring direction.

Further, according to the present invention, the mirror can be rotated in a horizontal direction and in an elevation direction, and the laser scanner further comprises a horizontal angle detector for detecting a horizontal angle of the mirror and an elevation angle detector for detecting an elevation angle of the mirror, and the measuring direction is designated based on the horizontal angle detected by the horizontal angle detector and based on the elevation angle detected by the elevation angle detector. As a result, the measurement range can be set up by using the functions of the laser scanner, and this leads to simpler system construction.

Also, according to the present invention, the mirror can be rotated in a horizontal direction and in an elevation direction, and the laser scanner further comprises a horizontal angle detector for detecting a horizontal angle and an elevation angle detector for detecting an elevation angle, and the measuring direction is designated based on the horizontal angle detected by the horizontal angle detector and based on the elevation angle detected by the elevation angle detector, and also based on a position on the screen. As a result, the measurement range can be set up by using the functions of the laser scanner, and this leads to simpler system construction.

DETAILED DESCRIPTION OF THE PREFERRED EMBODIMENTS

Description will be given below on the best mode for carrying out the invention by referring to the attached drawings.

First, description will be given on a laser scanner, in which the present invention is carried out.

Figure 1:
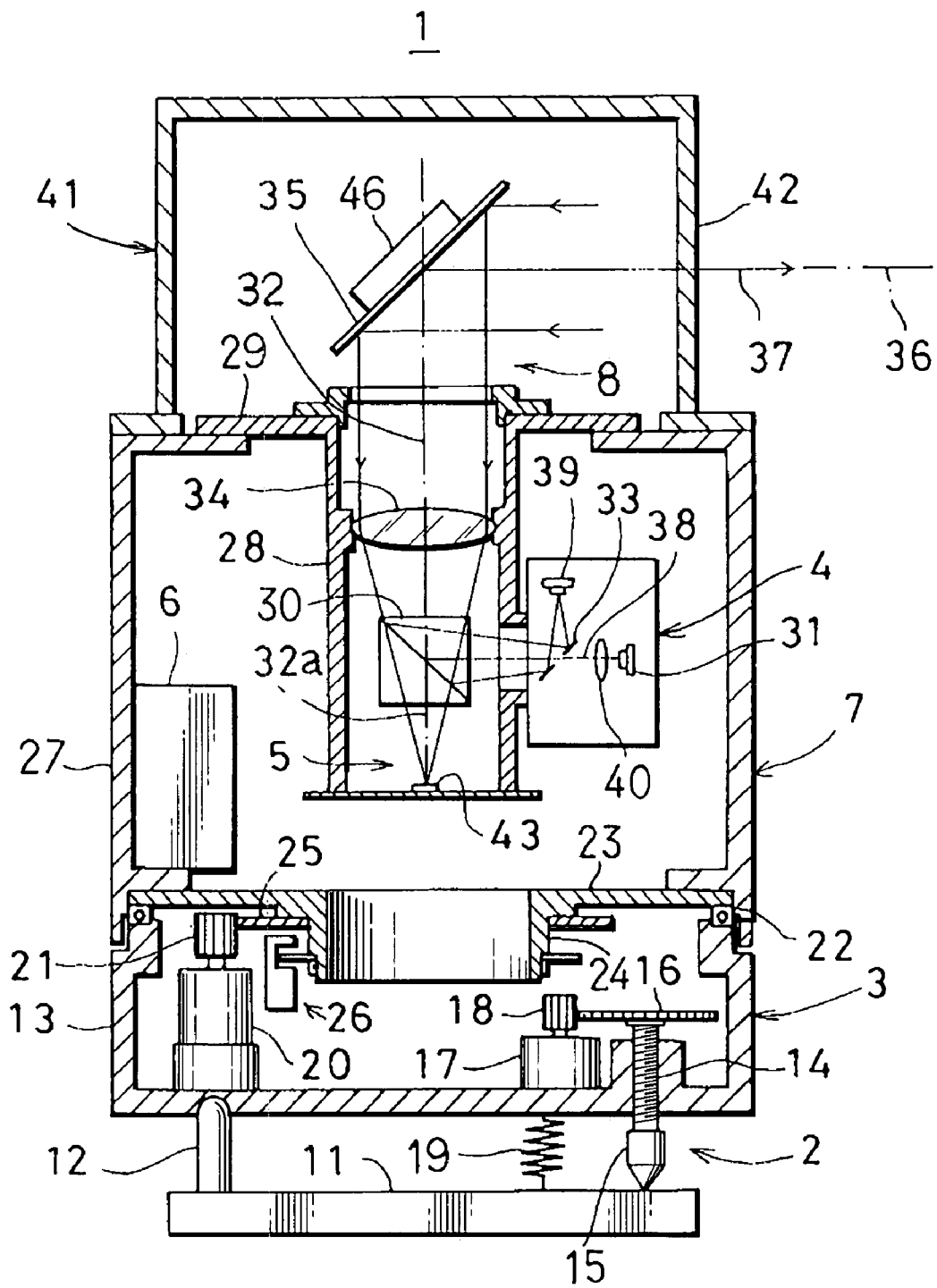
FIG. 1 is a cross-sectional view of a position measuring system according to a first embodiment of the present invention.
Figure 2:
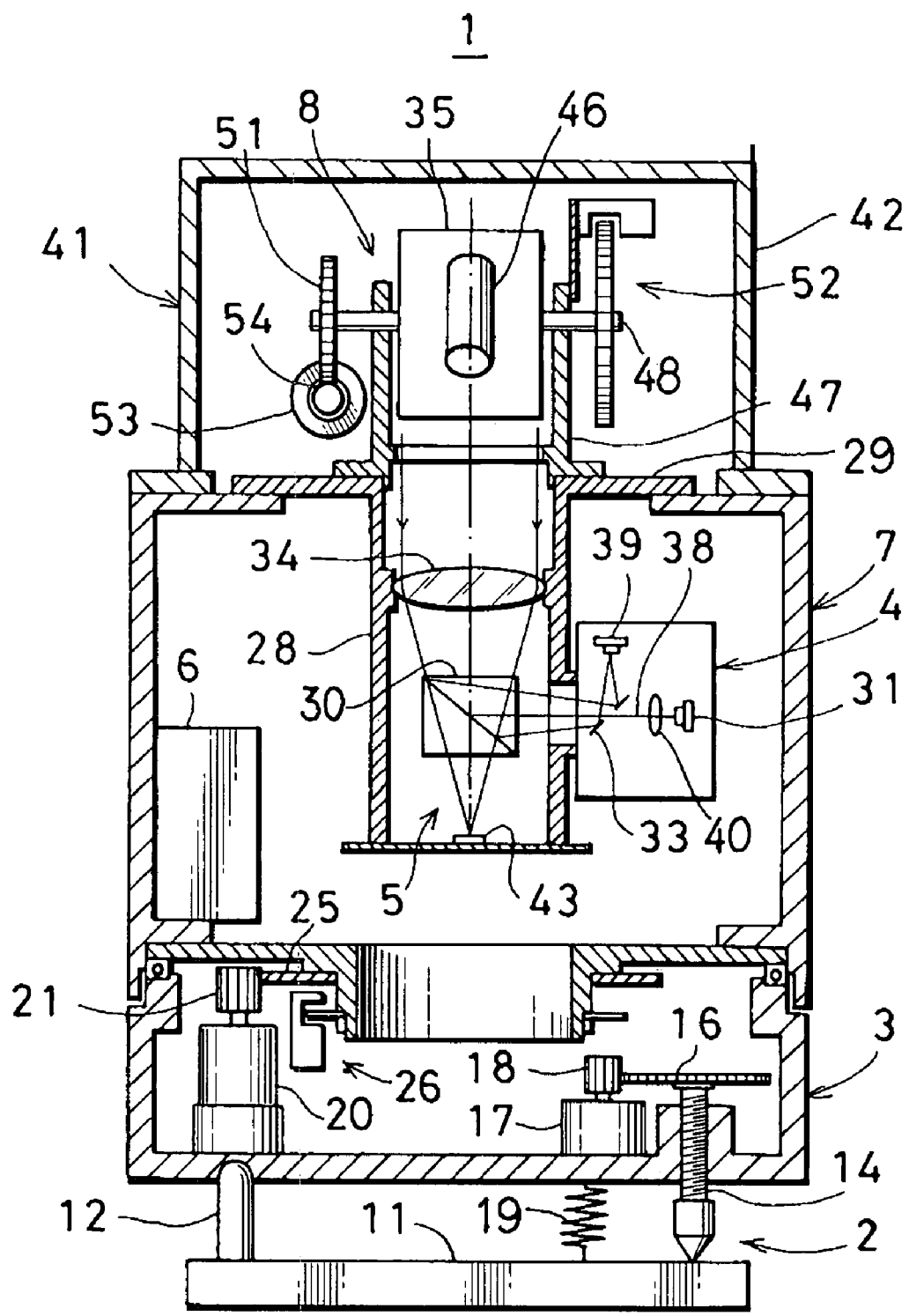
FIG. 2 is a cross-sectional view of the position measuring system according to the first embodiment of the present invention when a part of the position measuring system is rotated.

FIG. 1 and FIG. 2 each represents a position measuring system in a first embodiment of the invention.

A laser scanner 1 comprises a leveling unit 2, a rotary mechanism 3 installed on the leveling unit 2, a measuring system main unit 7 supported by the rotary mechanism 3 and including a distance measuring unit 4, an image pickup unit 5, a control unit 6, etc., and a rotary projection unit 8 installed on an upper portion of the measuring system main unit 7. For convenience purpose, FIG. 2 shows only a condition when the rotary projection unit 8 is seen from a lateral direction with respect to FIG. 1.

Now, description will be given on the leveling unit 2.

A pin 12 is erected on a base unit 11. The upper end of the pin 12 is formed with a curved surface and is tiltably engaged in a concave portion on the bottom surface of a lower casing 13. At other two points on the bottom surface, adjusting screws 14 are screwed in and are penetrating through. On the lower end of each of the adjusting screws 14, a leg member 15 is fixed. The lower end of the leg member 15 is formed with a tapered end or with a curved surface and is abutted to the base unit 11. On the upper end of the adjusting screw 14, a leveling driven gear 16 is attached. The lower casing 13 is supported on the base unit 11 at three points by the pin 12 and by the two adjusting screws 14 so that the lower casing 13 can be tilted in any direction around the tip of the pin 12. In order that the base unit 11 and the lower casing 13 are not separated from each other, a spring 19 is provided between the base unit 11 and the lower casing 13.

Two leveling motors 17 are mounted inside the lower casing 13 and a leveling driving gear 18 is attached on an output shaft of the leveling motor 17, and the leveling driving gear 18 is engaged with the leveling driven gear 16. The two leveling motors 17 are independently driven by the control unit 6. By the driving of the leveling motors 17, the adjusting screws 14 are rotated via the leveling driving gear 18 and the leveling driven gear 16 so that the amount of projection of the adjusting screws 14 in a downward direction can be adjusted. A tilt sensor 56 (see FIG. 4) is provided inside the lower casing 13. When the two leveling motors 17 are driven according to a detection signal of the tilt sensor 56, leveling of the leveling unit 2 is performed.

Next, description will be given below on the rotary mechanism 3.

The lower casing 13 also serves as a casing for the rotary mechanism 3. A horizontally rotating motor 20 is mounted in the lower casing 13, and a horizontal rotary driving gear 21 is mounted on an output shaft of the horizontal rotating motor 20.

On the upper end of the lower casing 13, a rotary base 23 is mounted via bearings 22. At the center of the rotary base 23, a rotation axis 24 projecting downward is provided. On the rotation axis 24, a horizontal rotary gear 25 is mounted, and the horizontal rotary driving gear 21 is engaged with the horizontal rotary gear 25.

A horizontal angle detector 26, e.g. an encoder, is mounted on the rotation axis 24. A relative rotation angle of the rotation axis 24 with respect to the lower casing 13 is detected by the horizontal angle detector 26. The results of the detection (horizontal angle) is inputted to the control unit 6. Based on the results of detection, driving of the horizontal rotating motor 20 is controlled by the control unit 6 so that a horizontal angle of the measuring system main unit 7 is turned to a value as designated.

Now, description will be given on the measuring system main unit 7.

A main unit casing 27 is fixed on the rotary base 23, and a body tube 28 is mounted inside the main unit casing 27. The body tube 28 has a centerline, which is coaxial with the rotation center of the main unit casing 27, and the body tube 28 is mounted by means as necessary on the main unit casing 27. For instance, on the upper end of the body tube 28, a flange 29 is formed, and the flange 29 is fixed on a ceiling of the main unit casing 27.

The body tube 28 has an emission light optical axis 32, which concurs with the axis of the body tube 28, and a beam splitter 30, serving as an optical separating means, is provided on the emission light optical axis 32. The beam splitter 30 allows visible light to pass and reflects infrared light. A reflection light optical axis 38 is separated from the emission light optical axis 32 by the beam splitter 30.

The distance measuring unit 4 is provided on the reflection light optical axis 38.

A light emitting element 31 is provided on the reflection light optical axis 38, and there are arranged an aperture mirror 33 and a collimator lens 40 on the reflection light optical axis 38. The reflection light optical axis 38 is branched off by the aperture mirror 33, and a distance measuring light receiving unit 39 is provided on the branched optical axis.

A pulsed laser beam is emitted from the light emitting element 31. The light emitting element 31 is a semiconductor laser or the like, for instance, and the light emitting element 31 emits a pulsed laser beam of infrared light as a distance measuring light 37, and the light emitting element 31 is controlled so that the pulsed laser beam is emitted under the condition as necessary by the control unit 6. The pulsed laser beam passes through the aperture mirror 33 and is reflected toward an elevation rotary mirror 35 by the beam splitter 30, and the pulsed laser beam is projected to an object to be measured via the elevation rotary mirror 35. The elevation rotary mirror 35 is a deflection optical member and is arranged on the emission light optical axis 32, and a condenser lens 34 is provided on the emission light optical axis 32. The elevation rotary mirror 35 deflects the emission light optical axis 32, which runs in a vertical direction, to a projection light optical axis 36 running in a horizontal direction.

A distance measuring light reflected from the object to be measured enters the distance measuring light receiving unit 39 via the elevation rotary mirror 35 and the aperture mirror 33. It is so arranged that a divided part of the distance measuring light 37 enters the distance measuring light receiving unit 39 as an internal reference light (not shown). Based on the reflected distance measuring light and the internal reference light, a distance to the object to be measured is determined.

The light emitting element 31, the aperture mirror 33, the condenser lens 34, the elevation rotary mirror 35, the reflection light optical axis 38, etc. make up together the distance measuring unit 4.

The emission light optical axis 32 passes through the beam splitter 30. On a through optical axis 32a, an image receiving unit 43 is mounted, and the image receiving unit 43 is positioned at the bottom of the body tube 28.

The image receiving unit 43 is an aggregate of a multiple of pixels on a plane, e.g. a CCD, and position of each pixel is designated around the through optical axis 32a. To designate the position of each pixel, X-Y coordinates having the optical axis as the origin is assumed, and the position of each pixel is designated by X-coordinate and Y-coordinate.

Further, an angle of the light beam entering the image receiving unit 43 is determined by the positions of pixels on the image receiving unit 43, and it is represented as a field angle.

The elevation rotary mirror 35, the condenser lens 34, the image receiving unit 43, etc. make up together the image pickup unit 5.

Next, description will be given on the rotary projecting unit 8.

Required parts of lateral walls and a ceiling of the casing 41 are made of transparent material such as glass or the like and serve as a transmission window 42. Through the transmission window 42, the distance measuring light 37 is projected and enters, and an external light for image pickup can enter.

A mirror holder 47 is mounted on the upper end of the flange 29. The elevation rotary mirror 35 is rotatably mounted on the mirror holder 47 via a rotation shaft 48. On one of shaft ends of the elevation rotary mirror 35, an elevation rotary gear 51 is attached, and an elevation angle detector 52 is mounted on the other of the shaft ends of the elevation rotary mirror 35. The elevation angle detector 52 is an encoder, for instance, and the elevation angle detector 52 detects the rotation angle (rotating position) of the elevation rotary mirror 35 and sends detection results to the control unit 6.

An elevation rotating motor 53 is mounted on the flange 29 or on the mirror holder 47. On an output shaft of the elevation rotating motor 53, an elevation rotary driving gear 54 is mounted, and the elevation rotary driving gear 54 engages with the elevation rotary gear 51. Based on the detection results of the elevation angle detector 52, driving of the elevation rotary mirror 35 is controlled by the control unit 6 so as to have an angle as desired. The control unit 6 can control the driving operation of the horizontal rotating motor 20 and the elevation rotating motor 53 so that the horizontal rotating motor 20 and the elevation rotating motor 53 are driven independently or synchronizingly.

A sighting device 46, serving as a measuring direction observing means, is mounted on an upper surface, i.e. on a surface, which is not a reflection surface, of the elevation rotary mirror 35. By the sighting device 46, an operator can observe a measuring direction, i.e. a projecting direction of the laser beam. The optical axis of the sighting device 46 is so arranged as to be included within a plane including the emission light optical axis 32 and the projection light optical axis 36. As the sighting device 46, a sight (foresight/backsight), a telescope, etc. may be used.

By the sighting device 46, the operator can collimate the measuring direction through the transmission window 42. By rotating the elevation rotary mirror 35 at an angle as required (a correction angle), the collimation light optical axis of the sighting device 46 is adjusted to concur with the projection light optical axis 36. In FIG. 1, for instance, when the elevation rotary mirror 35 is rotated at an angle of 45° in a clockwise direction in the figure, the collimation light optical axis of the sighting device 46 concurs with the projection light optical axis 36.

Figure 3:
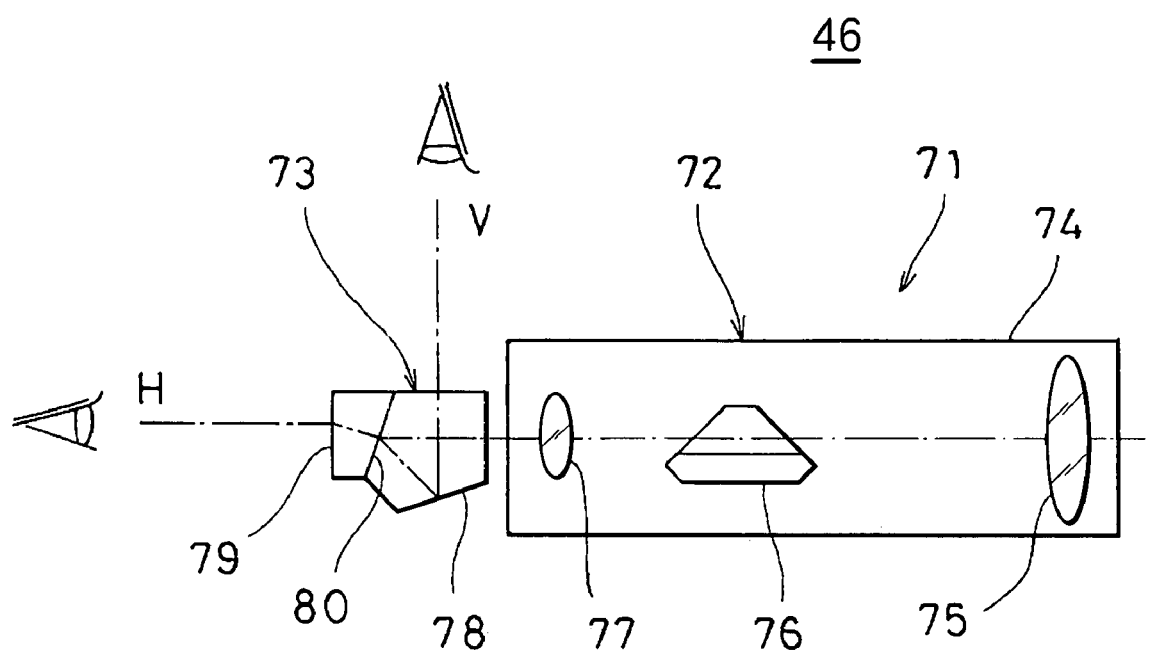
FIG. 3 is a schematical drawing of a sight (foresight/backsight) used as a means for observing a measuring direction used in the first embodiment of the invention.

FIG. 3 shows a sight 71 (foresight/backsight), which is an example of the sighting device 46.

The sight 71 primarily comprises a telescope unit 72 and an optical path deflecting means 73.

In approximate arrangement, the telescope unit 72 comprises a body tube 74, an objective lens 75 mounted in the body tube 74, an image rotator 76 for changing an inverted image to an erected image, and an ocular lens 77. The optical path deflecting means 73 comprises a pentagonal prism 78 positioned adjacent to the ocular lens 77, and a wedge prism 79 attached on the pentagonal prism 78. A boundary surface 80 between the pentagonal prism 78 and the wedge prism 79 is designed as a half-mirror. Instead of a half-mirror, the boundary surface 80 may be designed in such a manner that the pentagonal prism 78 and the wedge prism 79 are in optically non-contact state.

The pentagonal prism 78 deflects an optical axis, which runs perpendicularly to the collimation light optical axis, to the direction of the collimation optical axis. The wedge prism 79 corrects the optical axis running from the same direction as the collimation optical axis so that the optical axis is not deflected by the pentagonal prism 78. In the case where collimation can be made from a direction tilted at a predetermined angle with respect to the collimation optical axis, the wedge prism 79 may not be used. Further, the optical path deflecting means 73 may be a single-piece half-mirror.

Via the optical path deflecting means 73, collimation in the measuring direction can be made by the telescope unit 72 respectively from the same direction H as the optical axis of the telescope unit 72 and from a direction V which runs perpendicularly to the optical axis of the telescope unit 72.

Figure 4:
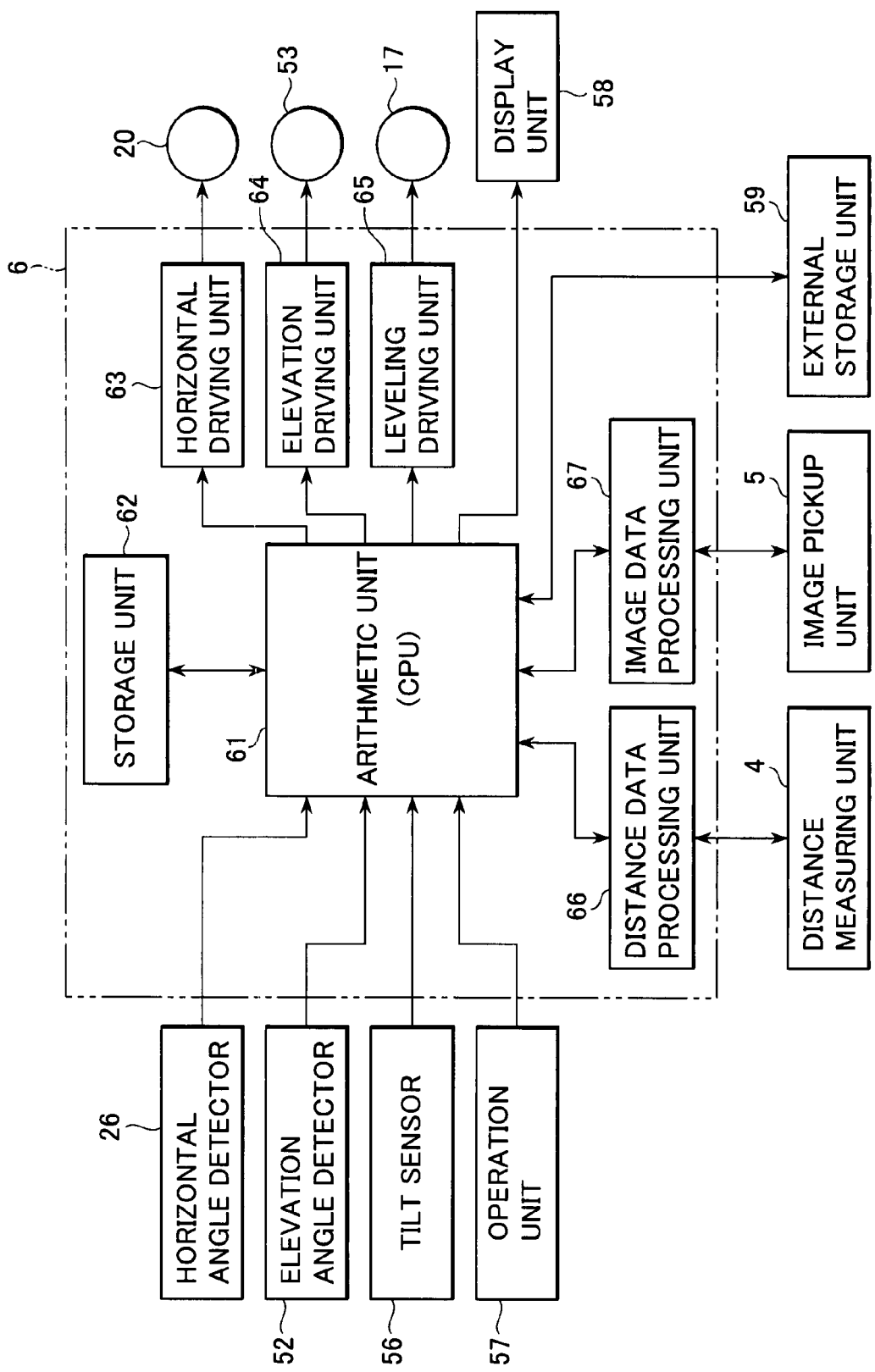
FIG. 4 is a block diagram to show an arrangement of the position measuring system of the first embodiment of the invention.

Referring to FIG. 4, description will be given below on an arrangement of a control system of the laser scanner 1.

Detection signals from the horizontal angle detector 26, the elevation angle detector 52 and the tilt sensor 56 are inputted to the control unit 6, and an instruction signal from the operation unit 57 is inputted to the control unit 6. The measurement operator inputs the conditions necessary for starting the measurement of the laser scanner 1, an instruction to start the measurement, etc. from the operation unit 57. The operation unit 57 may be provided in a casing such as the main unit casing 27, etc., or may be arranged independently so that controlling by remote control operation can be performed by using the means such as wireless communication, infrared light, etc.

The control unit 6 drives the horizontal rotating motor 20, the elevation rotating motor 53 and the leveling motor 17, and the control unit 6 also drives and controls a display unit 58, which displays operating conditions, measurement results, and images taken by the image pickup unit 5, etc. An external storage unit 59 such as a memory card, a HDD, etc. is provided in the control unit 6, or the external storage unit 59 may be removably arranged.

Now, description will be given on general features of the control unit 6.

The control unit 6 comprises an arithmetic unit 61 represented by a CPU, and a storage unit 62 for storing programs and data such as measurement data, image data, etc. These programs include a sequence program and a computation program which are necessary for measuring a distance and detecting an elevation angle and a horizontal angle, a measurement data processing program for executing the processing of the measurement data, an image processing program for performing image processing, an image display program for displaying the data on the display unit 58, and a program for integrally managing these programs. Further, the control unit 6 comprises a horizontal driving unit 63 for driving and controlling the horizontal rotating motor 20, an elevation driving unit 64 for driving and controlling the elevation rotating motor 53, a leveling driving unit 65 for driving and controlling the leveling motor 17, a distance data processing unit 66 for processing distance data obtained by the distance measuring unit 4, an image data processing unit 67 for processing image data obtained by the image pickup unit 5 and so on.

The functions of the distance data processing unit 66 and the image data processing unit 67 may be executed by the arithmetic unit 61. In this case, the distance data processing unit 66 and the image data processing unit 67 may not be used. Also, in the case the distance data processing unit 66 and the image data processing unit 67 are provided separately, distance data processing and image data processing can be carried out in parallel, and this makes it possible to perform the processing at high speed.

Further, the distance data processing unit 66 and the image data processing unit 67 may be provided separately. For instance, a personal computer (PC) may be provided separately, and the functions of the distance data processing unit 66 and the image data processing unit 67 may be executed by the PC. In this case, distance data and image data may be stored in the external storage unit 59, and after storing the data, the external storage unit 59 is connected to the PC, and the processing of the distance data and the image data may be performed by the PC. If the data acquired by the laser scanner 1 is sent to the PC by communication means as required such as wireless LAN or the like, the external storage unit 59 may not be used.

In the storage unit 62, there is stored and set in advance a correction angle (e.g. 45° in the figure) for concuring the optical axis of the sighting device 46 with the projection light optical axis 36.

Figure 6:
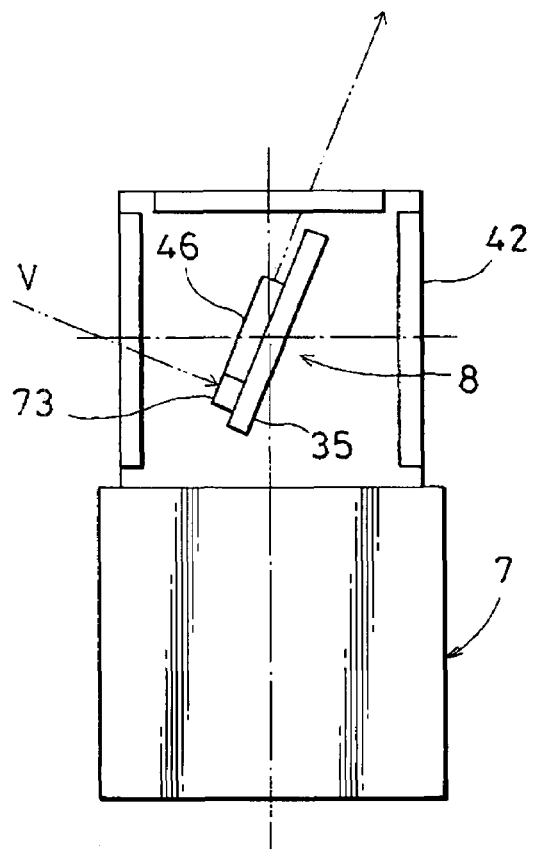
FIG. 6 is a schematical drawing to explain operation when the measurement range is set up in the first embodiment of the invention.
Figure 7:
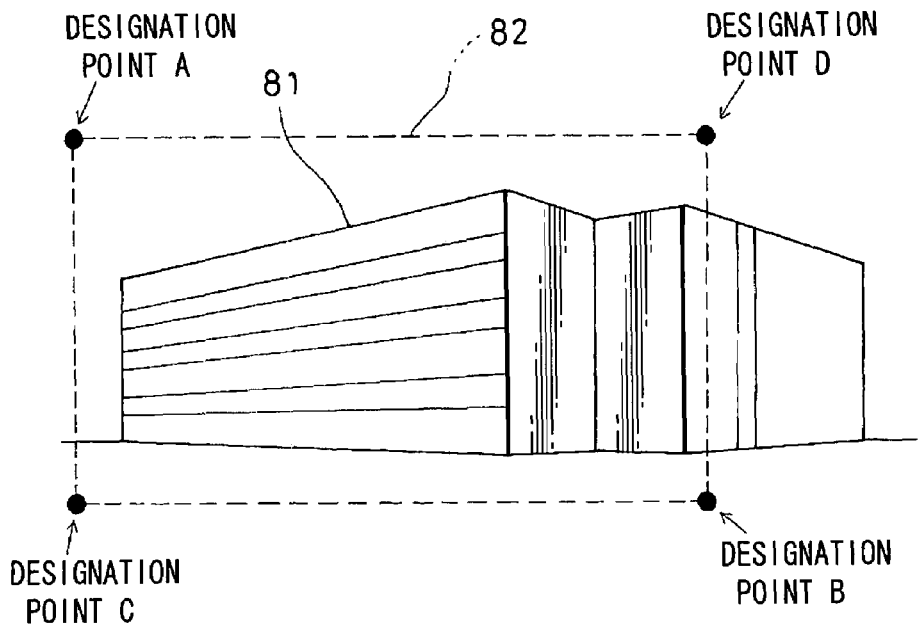
FIG. 7 is a drawing to represent relationship between the measurement range and the object to be measured.

Next, referring to FIG. 5 to FIG. 7, description will be given on operation of the measurement by the laser scanner 1.

The laser scanner 1 is installed at a position as required such as a known point, and leveling operation is instructed from the operation unit 57.

The leveling motor 17 is driven via the leveling driving unit 65. Tilting of the laser scanner 1 is detected by the tilt sensor 56, and the result of detection by the tilt sensor 56 is fed back to the control unit 6. The adjusting screws 14 are rotated by the leveling motors 17 so that the tilt sensor 56 detects horizontal position.

When the leveling operation is completed, the completion of the leveling operation is displayed on the display unit 58, or is announced by means such as alarm sound, etc.

Next, the measurement range is set up.

When measurement range setting mode is selected from the operation unit 57, the elevation rotary mirror 35 is rotated at the correction angle by the elevation rotating motor 53. Then, the collimation optical axis of the sighting device 46 is adjusted to concur with the projection light optical axis 36 under the measuring condition. As described above, the rotation angle of the elevation rotary mirror 35 is set in advance. The rotation angle of the elevation rotary mirror 35 is detected by the elevation angle detector 52, and the control unit 6 controls in such a manner that the elevation rotary mirror 35 is accurately rotated by the correction angle.

The operator for measurement collimates the sighting device 46. The horizontal rotating motor 20 and the elevation rotating motor 53 are driven by the operation unit 57. The collimating direction is rotated in a horizontal direction and in an up-to-bottom direction, and the collimating direction is changed. When the collimating direction is corrected by the correction angle, the collimating direction concurs with the projecting direction of the laser beam, i.e. the measuring direction. Thus, the measuring direction can be adjusted for the setting of the measurement range by the operation unit 57.

At least 3 points for setting the measurement range are set up by the operation unit 57 while performing the collimation. For instance, as shown in FIG. 7, in the case a rectangular measurement range 82 including an object to be measured 81 is set up, designation points A, B, C and D, which are four vertexes of the rectangle, are set up from the operation unit 57.

Figure 8:
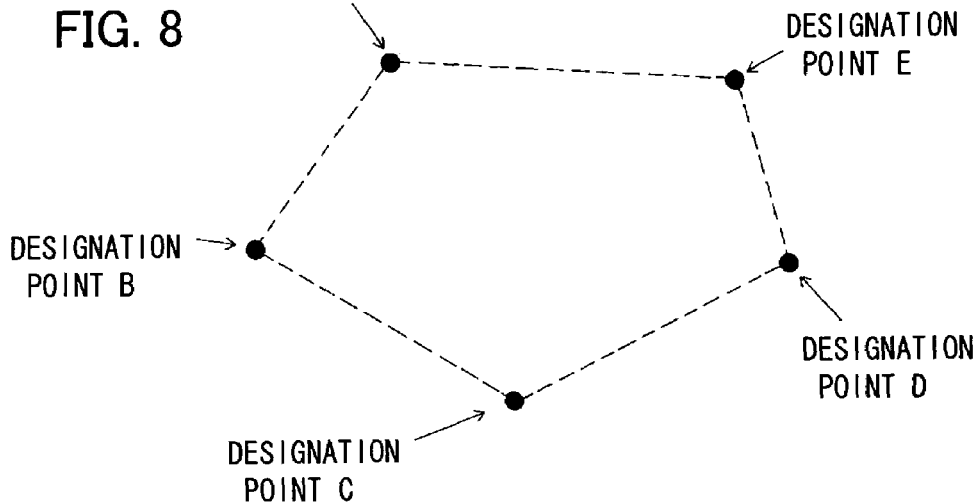
FIG. 8 is a drawing to show an aspect of the setting of the measurement range.

For the setting of the designation points, it is suffice that the measurement range 82 can be set up as an area. As shown in FIG. 8, 5 designation points A, B, C, D and E may be set up, or 6 or more designation points may be set up. In the case the measurement range 82 is set up in advance in form of a square, a rectangle, etc., two points on a diagonal line may be set up. Or, in the case of a circle, two points to define the shape, e,g. a point at the center and the radius may be set up.

Figure 5:
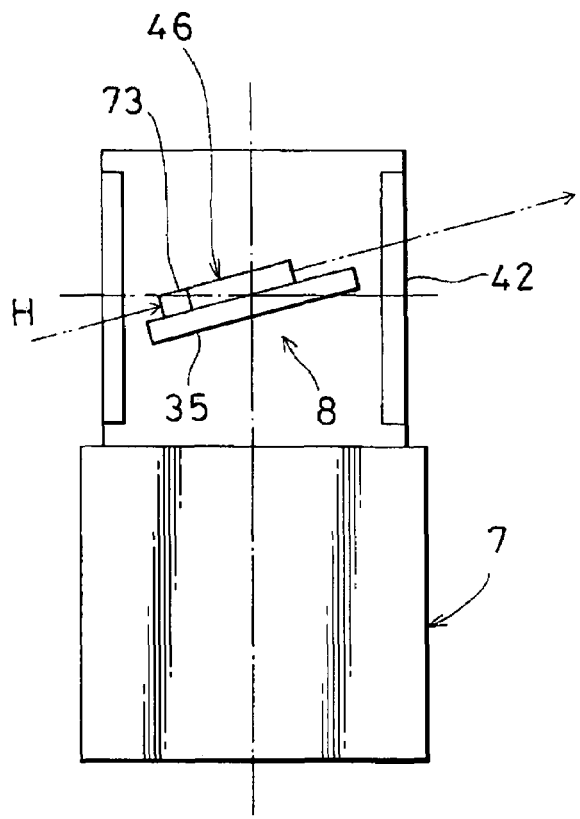
FIG. 5 is a schematical drawing to explain operation when a measurement range is set up in the first embodiment of the invention.

When collimation is performed on the designated points of A, B, C and D by the sighting device 46, in the case the elevation angle is in a horizontal direction or closer to in a horizontal direction, the sighting device 46 is collimated from the H direction as shown in FIG. 3 and FIG. 5. In the case the elevation angle is in a vertical direction or closer to in a vertical direction, the sighting device 46 is collimated from the V direction as shown in FIG. 3 and FIG. 6.

By collimating the sight 71 via the optical path deflecting means 73, the measurement operator can collimate the designated points A, B, C and D regardless of the posture of the sight 71. For instance, collimation can be performed by the sight 71 even when the designated points are in the direction of the zenith.

When the designated points A, B, C, and D are set up, the horizontal angles detected by the horizontal angle detector 26 or the elevation angles detected by the elevation angle detector 52 are respectively stored in the storage unit 62, and the elevation angles are corrected to the elevation angles of the projection light optical axis 36 at the time of measurement according to the correction angle. The measurement range 82 is set up according to the horizontal angles and the corrected elevation angles, and the measurement range 82 is stored in the storage unit 62.

Image pickup of the measurement range 82 is performed by the image pickup unit 5. In the case the scope of the measurement range 82 is larger than the field angle of the image pickup unit 5, the measurement range 82 is divided and images are taken, and the image of the measurement range 82 is acquired.

By displaying the acquired image of the measurement range 82 on the display unit 58, the measurement range is set up in a manner similar to the setting of the designation points by the sight 71.

When the starting of the measurement is instructed by the operation unit 57, the control unit 6 allows a pulsed laser beam to be projected for scanning on the measurement range 82 thus set up, and measurement is performed for each pulse.

The distance measuring light is emitted with pulses from the light emitting element 31. The distance measuring light passes through the aperture of the aperture mirror 33 and is deflected by the beam splitter 30 and the elevation rotary mirror 35 and is projected on the projection light optical axis 36. Being reflected by the object to be measured 81, the reflected distance measuring light is deflected to the reflection light optical axis 38 by the elevation rotary mirror 35 and the beam splitter 30. Then, the reflected distance measuring light is reflected by the aperture mirror 33 and is received by the distance measuring light receiving unit 39.

The horizontal rotating motor 20 and the elevation rotating motor 53 are driven in synchronization. By the distance measuring light 37 emitted with pulses, the range of the measurement range 82 is scanned. At the distance measuring unit 4, the distance is measured for each pulse based on the reflected distance measuring light.

The distance data is acquired by distance measurement for each pulse. Also, the horizontal angle detected by the horizontal angle detector 26 and the elevation angle detected by the elevation angle detector 52 when the pulsed light is emitted are acquired at the same time. Each distance data is associated with the elevation angle data and the horizontal angle and is stored in the storage unit 62.

Then, three-dimensional data are calculated according to the measured distance, the horizontal angle, and the elevation angle. The three-dimensional data thus acquired may be associated with the acquired image. The three-dimensional data and the image can be easily associated with each other without requiring image processing such as conversion of a coordinate axis, correction of tilting, etc. because the optical axis of the distance measurement and the optical axis of the image pickup are the same as the projection light optical axis 36.

In the case the image data is not required, the acquisition of the image by the image pickup unit 5 and the association of the image with three-dimensional data are not performed.

Figure 9:
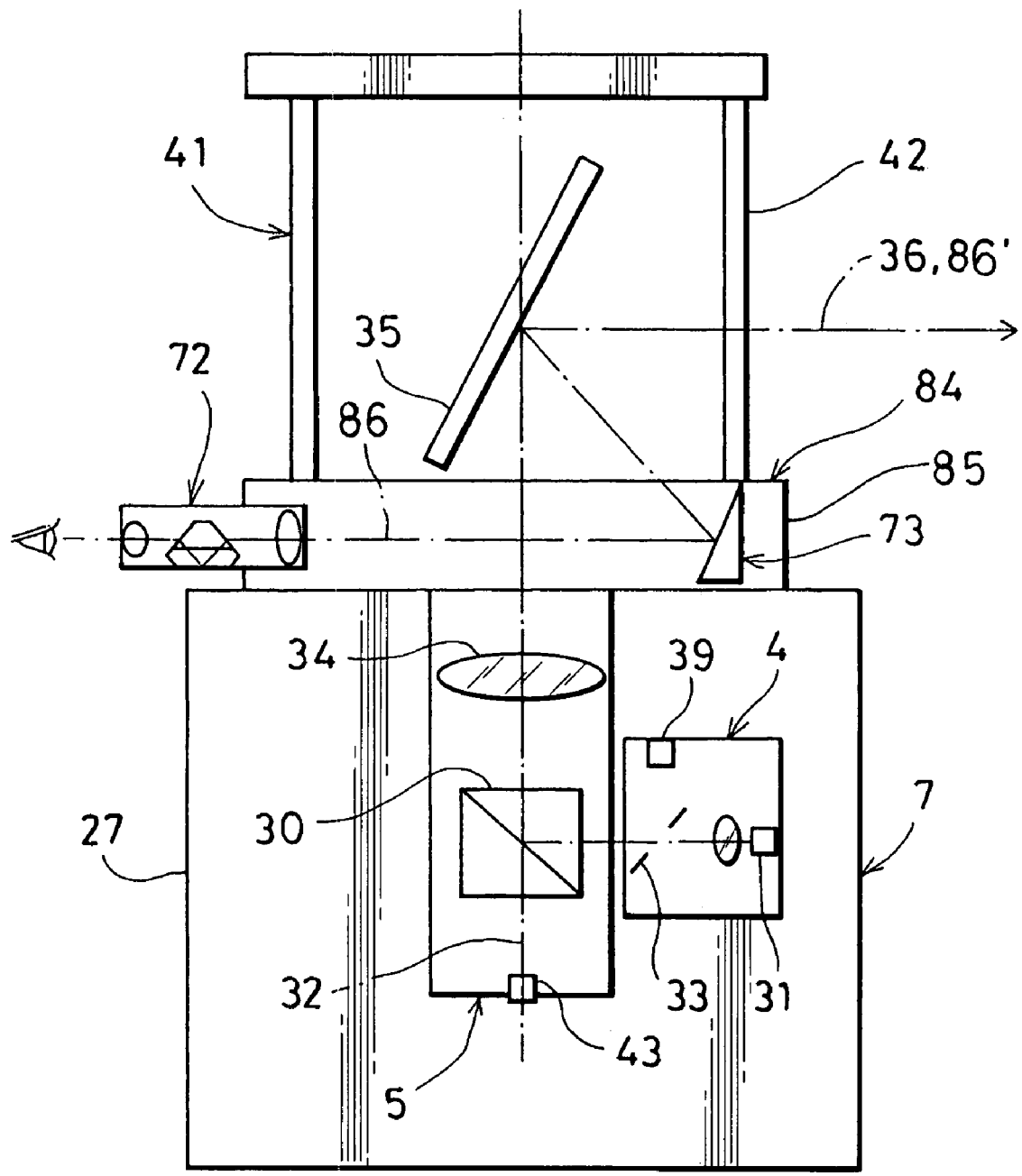
FIG. 9 is a schematical cross-sectional view of a position measuring system in a second embodiment of the invention.

FIG. 9 shows a position measuring system in a second embodiment of the invention.

In FIG. 9, the components shown in FIG. 1, FIG. 2 and FIG. 3 are referred by the same symbols, and the details are not shown.

In the second embodiment, the measuring direction observing means is provided separately from the elevation rotary mirror 35.

On an upper surface of the main unit casing 27, a sighting device 84, serving as the measuring direction observing means, is provided, and an upper casing 41 is arranged on the main unit casing 27 via the sighting device 84.

Inside the upper casing 41, the elevation rotary mirror 35 is rotatably supported around a horizontal rotation shaft (perpendicular to the paper surface), and is rotated by an actuator as required. The rotation angle is detected by the elevation angle detector as an elevation angle. Supporting mechanism, driving mechanism, etc. of the elevation rotary mirror 35 are similar to those explained in connection with the first embodiment, and detailed description is not given here.

The sighting device 84 comprises a telescope unit 72 and an optical path deflecting means 73, and the telescope unit 72 and the optical path deflecting means 73 are held by an accommodation unit 85.

The telescope unit 72 has an optical axis 86, which runs perpendicularly to the emission light optical axis 32 of the image receiving unit 43, and the optical path deflecting means 73 is provided on the optical axis 86. The optical path deflecting means 73 is an optical member such as a reflection mirror, a reflection prism, etc. The optical path deflecting means 73 deflects the optical axis 86 so as to be directed toward the elevation rotary mirror 35. The optical axis 86 thus deflected concurs with the emission light optical axis 32 on the reflection surface of the elevation rotary mirror 35. The optical axis 86 is further deflected in a horizontal direction by the elevation rotary mirror 35, and the deflected optical axis 86' concurs with the projection light optical axis 36.

The angle of the reflection surface of the optical path deflecting means 73 with respect to the optical axis 86 is set so that the optical axis 86' concurs with the projection light optical axis 36.

According to the second embodiment as described above, when the elevation rotary mirror 35 is rotated, the elevation angle is changed by maintaining the projection light optical axis 36 and the optical axis 86' in a state concurring with each other. Therefore, the measurement operator can always collimate from a horizontal direction, i.e. from a constant direction, regardless of the elevation angle of the elevation rotary mirror 35. This contributes to easier collimation and to the improvement of working efficiency.

In the description given above, the optical axis of the telescope unit 72 runs perpendicularly to the emission light optical axis 32, while it may be designed in such manner that the optical axis 86 is tilted or the optical axis 86 may be tilted by separately providing a deflecting optical member to tilt the mounting posture of the telescope unit 72, and collimation may be performed from an obliquely upward direction or from an obliquely downward direction.

According to the present invention, by using a single-piece laser scanner 1 only, operation can be performed through all of the procedures from the setting of the measurement range to the measurement by scanning of the pulsed laser beam.

Further, the measurement range can be set up by visual inspection by the measurement operator.

This makes it possible to perform quick and accurate setting and to improve the working efficiency.

What is claimed is:

1. A laser scanner, comprising a mirror rotatably provided, a driving unit for rotating said mirror, a distance measuring unit for projecting a distance measuring light for scanning to a measurement range via said mirror and for obtaining a position data by receiving the reflected distance measuring light via said mirror, a measuring direction observing means for indicating a projecting direction of said distance measuring light, and an operation unit for setting the measurement range by designating at least two measuring directions based on the result of observation of the measuring direction obtained by said measuring direction observing means.

2. A laser scanner according to claim 1, wherein said measuring direction observing means is a sighting device mounted on said mirror.

3. A laser scanner according to claim 2, wherein said sighting device comprises an optical path deflecting means for deflecting a collimating direction.

4. A laser scanner according to claim 1, wherein said measuring direction observing means is provided separately from said mirror, and comprises a telescope unit and an optical path deflecting means for deflecting an optical axis of said telescope unit in the projecting direction of the distance measuring light.

5. A laser scanner according to claim 1, wherein said mirror can be rotated in a horizontal direction and in an elevation direction, and wherein said laser scanner further comprises a horizontal angle detector for detecting a horizontal angle of said mirror and an elevation angle detector for detecting an elevation angle of said mirror, and wherein the measuring direction is designated based on the horizontal angle detected by said horizontal angle detector and based on the elevation angle detected by the elevation angle detector.

6. A laser scanner according to claim 1 or 4, wherein said measuring direction observing means comprises a digital image pickup unit for acquiring image data via said mirror and a display unit for displaying the acquired image.

7. A laser scanner according to claim 6, wherein the measuring direction is designated on a display screen displayed on said display unit.

8. A laser scanner according to claim 7, wherein said mirror can be rotated in a horizontal direction and in an elevation direction, and wherein said laser scanner further comprises a horizontal angle detector for detecting a horizontal angle and an elevation angle detector for detecting an elevation angle, and wherein the measuring direction is designated based on the horizontal angle detected by said horizontal angle detector and based on the elevation angle detected by the elevation angle detector, and also based on a position on the screen.

* * * * *